United States Patent
Chakraborty et al.

(10) Patent No.: US 8,838,069 B2
(45) Date of Patent: Sep. 16, 2014

(54) DEVICES, SYSTEMS, AND METHODS FOR SHARING NETWORK SERVICES

(75) Inventors: Soumyajit Chakraborty, Harrison, NJ (US); James Gordon Beattie, Jr., Bergenfield, NJ (US); Stephen J. Griesmer, Westfield, NJ (US); Shiv Kumar, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 398 days.

(21) Appl. No.: 12/963,612

(22) Filed: Dec. 8, 2010

(65) Prior Publication Data

US 2012/0149328 A1 Jun. 14, 2012

(51) Int. Cl.
| | |
|---|---|
| *H04W 12/06* | (2009.01) |
| *H04W 4/00* | (2009.01) |
| *H04M 3/42* | (2006.01) |
| *H04L 12/28* | (2006.01) |
| *H04W 8/18* | (2009.01) |
| *H04W 88/04* | (2009.01) |

(52) U.S. Cl.
CPC .......... *H04M 3/42238* (2013.01); *H04W 4/001* (2013.01); *H04W 8/18* (2013.01); *H04W 88/04* (2013.01); *H04W 4/003* (2013.01); *H04M 2207/18* (2013.01)
USPC ...................... 455/411; 455/414.1; 455/432.1; 370/331; 370/400

(58) Field of Classification Search
CPC ...... H04W 12/06; H04W 8/183; H04W 80/04
USPC ............. 455/411, 414.1, 432.1; 370/331, 400
See application file for complete search history.

(56) References Cited

U.S. PATENT DOCUMENTS

| | | | |
|---|---|---|---|
| 7,006,836 B2 * | 2/2006 | Yokoyama | ................. 455/456.1 |
| 7,154,889 B1 | 12/2006 | Rekhter | |
| 7,624,270 B2 | 11/2009 | Pathan | |
| 7,734,751 B2 | 6/2010 | Donescu | |
| 2008/0219213 A1 | 9/2008 | Natarajan | |
| 2008/0229202 A1 | 9/2008 | Fang | |
| 2009/0061862 A1 | 3/2009 | Alberth, Jr. | |
| 2010/0093342 A1* | 4/2010 | Ramachandra et al. | ... 455/432.1 |
| 2011/0151835 A1* | 6/2011 | Velusamy | ..................... 455/411 |

* cited by examiner

*Primary Examiner* — Christopher M Brandt
*Assistant Examiner* — Muthuswamy Manoharan
(74) *Attorney, Agent, or Firm* — Hartman & Citrin LLC (57) ABSTRACT

Devices, systems and methods are disclosed which relate to mobile communication device users sharing their subscribed network services with other mobile communication device users. A borrowing mobile communication device is provided with the ability to remotely connect to a lending mobile communication device and use the subscribed network services of the lending mobile communication device when needed. This method allows the user of the lending mobile communication device to share subscribed network services. Besides using network services, it is possible to share displays between two mobile communication devices. A user of a lending mobile communication device shares the current display with a borrowing mobile communication device and vice-versa. This allows sharing among people who are not family members. Any registered user may subscribe to this network service sharing service and create a peer network. Users have the option to turn sharing on or off in the lending preferences.

20 Claims, 7 Drawing Sheets

DEVICES, SYSTEMS, AND METHODS FOR SHARING NETWORK SERVICES

BACKGROUND OF THE SUBJECT DISCLOSURE

1. Field of the Subject Disclosure

The present subject disclosure relates to mobile communication devices. More specifically, the present subject disclosure relates to sharing network services among mobile communication devices.

2. Background of the Subject Disclosure

Mobile communication devices, such as cellular phones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Cellular networks have increased the amount of cellular coverage and services available to consumers. Cellular consumers have the option of enjoying services like data, Short Message Service (SMS), video conference, conference calling, long distance, roaming, etc. However, not every user has these services available.

Family plans have become popular as well. These plans offer minutes and/or bandwidth that the family can share. However, there is nothing outside of family plans that allow any sharing. Presently, there is no way to share the data service between users. For instance, users may need access to data, but don't currently subscribe to a data plan. There is a need for users to have the ability to share their services with other users.

In some instances, the service is not as desired as the result. For instance, a user may access a map on their telephone using GPS and a data service. A friend of the user may wish to access that same map. In another instance, a user may not have a cellular signal at all, but can communicate with a friend's cellular telephone through BLUETOOTH, WiFi, etc.

What is needed in the art is a system that offers sharing of network services.

SUMMARY OF THE SUBJECT DISCLOSURE

The present subject disclosure gives mobile communication device users the ability to share their subscribed network services with other mobile communication device users. In exemplary embodiments, a borrowing mobile communication device is provided with the ability to remotely connect to a lending mobile communication device and use the subscribed network services of the lending mobile communication device when needed. This method allows the user of the lending mobile communication device to share subscribed network services. Besides using network services, it is possible to share displays between two mobile communication devices. A user of a lending mobile communication device shares the current display with a borrowing mobile communication device and vice-versa. This allows sharing among people who are not family members. Any registered user may subscribe to this network service sharing service and create a peer network. Users have the option to turn sharing on or off in the lending preferences.

In one exemplary embodiment, the present subject disclosure is a system for sharing network services. The system includes a network, a lending mobile communication device in communication with the network, the lending mobile communication device including a transceiver, a lending logic on the lending mobile communication device for receiving a request to use a network service on the lending mobile communication device, sending authorization to use the network service, and establishing a session for using the network service, a borrowing mobile communication device in communication with the lending mobile communication device, and a borrowing logic on the borrowing mobile communication device for submitting a request to use a network service on the lending mobile communication device, receiving authorization to use the network service, and establishing a session for using the network service. Once the session is established, the borrowing mobile communication device uses at least one network service.

In another exemplary embodiment, the present subject disclosure is a method for using shared network services. The method includes submitting a request to use a network service on a lending mobile communication device, receiving authorization to use the network service, establishing a session for using the network service, and using the network service.

In yet another exemplary embodiment, the present subject disclosure is a device for using shared network services. The device includes a processor, a memory in communication with the processor, a transceiver in communication with the processor, a borrowing logic on the memory for submitting a request to use a network service on the lending mobile communication device, receiving authorization to use the network service, and establishing a session for using the network service. Once the session is established, the borrowing mobile communication device uses at least one network service.

DETAILED DESCRIPTION OF THE SUBJECT DISCLOSURE

The present subject disclosure gives mobile communication device users the ability to share their subscribed network services with other mobile communication device users. In exemplary embodiments, a borrowing mobile communication device is provided with the ability to remotely connect to a lending mobile communication device and use the subscribed network services of the lending mobile communication device when needed. This method allows the user of the lending mobile communication device to share subscribed network services. Besides using network services, it is possible to share displays between two mobile communication devices. A user of a lending mobile communication device shares the current display with a borrowing mobile communication device and vice-versa. This allows sharing among people who are not family members. Any registered user may subscribe to this network service sharing service and create a peer network. Users have the option to turn sharing on or off in the lending preferences.

In exemplary embodiments, a lending mobile communication device shares a data service with a peer's mobile communication device. Once in a network service sharing session with the lending mobile communication device, the user of the borrowing mobile communication device has the capability to borrow that service temporarily while the session is active. Besides data service, subscribers may also share minutes or other services like international calling, text, applications, etc. The user of the borrowing mobile communication device is charged each time the service is used and can also be charged separately for the services used.

The user can borrow network services from the lending mobile communication device and get virtual access to the network services from the borrowing mobile communication device until the session is over. If the lending mobile communication device is not responsive, then the user selects other added lenders in range.

Besides using services, displays may be shared between two mobile communication devices, so that the lending mobile communication device can share the current display with the borrowing mobile communication device. For example, while both users are driving, the lending user pulls up a map to the destination on his mobile communication device. The borrowing user connects in a sharing session, and is able to view the display of the lending mobile communication device on the display of the borrowing mobile communication device. The borrowing user is able to see the map or details to their destination. The lending user might also share his display with the borrowing user to show anything that may be on the display, such as a picture, movie, webpage, etc.

Sharing displays is not limited to two mobile communication devices. Displays can be shared among multiple mobile communication devices. In exemplary embodiments, the sharing session is extended to multiple subscribers and the HLR supports that authentication. Sharing displays may require use of an IP Multimedia Services (IMS) network.

A "network service", as used herein and throughout this disclosure, refers to any communication mode or feature provided by a service provider for use through a mobile communication device. Examples of network services include data, Short Message Service (SMS), display sharing, video conference, conference calling, long distance, roaming, etc. Network services are often included in a subscriber profile, which is referenced by a Home Location Register (HLR) in cellular systems.

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile communication devices using appropriate analog-digital-analog converters and other elements. Communication is enabled by hardware elements called "transceivers." Mobile communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 113 and 213, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
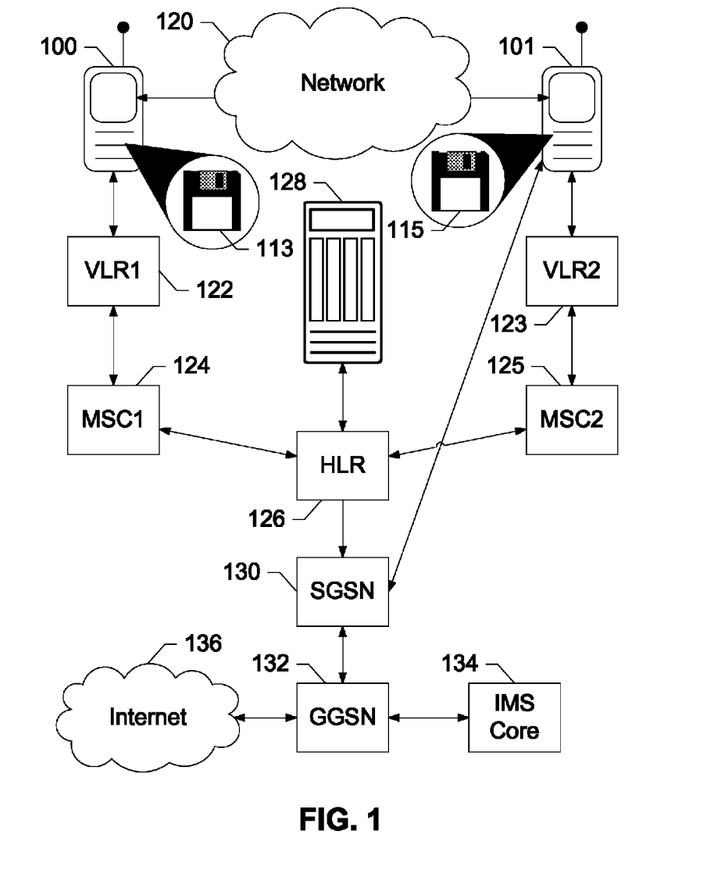
FIG. 1 shows a system for sharing network services, according to an exemplary embodiment of the present subject disclosure.

FIG. 1 shows a system for sharing network services, according to an exemplary embodiment of the present subject disclosure. The system includes a borrowing mobile communication device 100 having a borrowing logic 113, a lending mobile communication device 101 having a lending logic 115, a network 120, a first Visitor Location Register (VLR1) 122, a first Mobile Switching Center (MSC1) 124, a second VLR (VLR2) 123, a second MSC (MSC2) 125, a Home Location Register (HLR) 126, a billing server 128, a Serving GPRS Support Node (SGSN) 130, a Gateway GPRS Support Node (GGSN) 132, an IP Multimedia Subsystem (IMS) Core 134, and an Internet 136. Borrowing mobile communication device 100 is in communication with lending mobile communication device 101 through network 120. When a user of borrowing mobile communication device 100 desires to use a service to which the user is not presently subscribed, borrowing mobile communication device 100 connects to lending mobile communication device 101 in a sharing session. If a user of lending mobile communication device 101 approves the session, borrowing mobile communication device 100 may use any of the services subscribed to by lending mobile communication device 101 that lending mobile communications device 101 has approved for sharing. VLR1 122 and MSC1 124 track borrowing mobile communication device 100 and send the results to HLR 126. HLR 126 locates the subscriber profile of borrowing mobile communication device 100 to verify that borrowing mobile communication device 100 has subscribed to service sharing. VLR2 123 and MSC2 125 track lending mobile communication device 101 allowing HLR 126 to load the subscriber profile of lending mobile communication device 101. Once borrowing mobile communication device 100 attempts to use a network service, HLR 126 verifies that lending mobile communication device 101 subscribes to that service. In this system, borrowing mobile communication device 100 is using a data service and a display sharing service through lending mobile communication device 101. Lending mobile communication device 101 connects to the Internet 136 through GGSN 132 and SGSN 130. When display sharing, borrowing mobile communication device 100 connects to IMS Core 134. HLR 126 reports the usage of the network service sharing session to billing server 128.

Borrowing mobile communication device 100 connects to lending mobile communication device 101 through network 120. In this exemplary embodiment, network 120 is part of a cellular network. However, in other embodiments, the borrowing mobile communication device may not have a connection to the cellular network, but has a BLUETOOTH, WiFi, etc., connection to the lending mobile communication device. In these embodiments, the lending mobile communication device shares a voice service with the borrowing mobile communication devices. The HLR tracks the service profile of the borrowing mobile communication device through the lending mobile communication device. When the borrowing mobile communication device makes a call to another mobile communication device, the caller ID reveals the number of the borrowing mobile communication device.

This exemplary embodiment of a system for sharing network services is shown through a cellular network. However, other networks are suitable for a system of network service sharing through mobile communication devices. These networks include a WiFi network, etc. Moreover, any cellular system can make use of network service sharing with minimal modifications. The borrowing logic and the lending logic can be easily added to legacy cellular telephones. The HLR can also be easily modified with logic or programming to allow the HLR to track two subscriber profiles. Other embodiments of a network service sharing system include similar elements to the exemplary embodiment in FIG. 1, yet data flows through the elements in a different order.

Figures 2A, 2B:
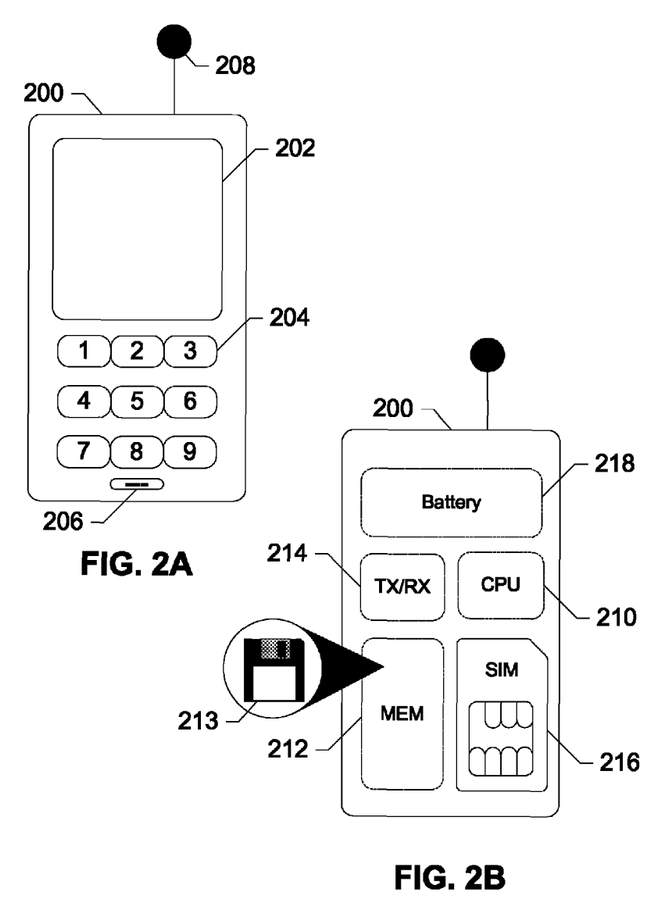
FIG. 2A shows a borrowing mobile communication device for using shared network services, according to an exemplary embodiment of the present subject disclosure.
FIG. 2B shows the inner components of a borrowing mobile communication device, according to an exemplary embodiment of the present subject disclosure.

FIG. 2A shows a borrowing mobile communication device 200 for using shared network services, according to an exemplary embodiment of the present subject disclosure. Borrowing mobile communication device 200 includes a display 202, a keypad 204, a microphone 206, and an antenna 208. Display 202 is a liquid crystal display (LCD) which serves as a visual output for the user. Keypad 204 is an input for entering information and commands to borrowing mobile communication device 200. Microphone 206 accepts aural input and allows borrowing mobile communication device 200 to deliver voice communication to the network and other mobile communication devices. Antenna 208 sends and receives wireless radiofrequency (RF) signals to and from wireless networks and other wireless devices.

FIG. 2B shows the inner components of a borrowing mobile communication device 200, according to an exemplary embodiment of the present subject disclosure. The inner components of borrowing mobile communication device 200 include a processor 210, a memory 212 including a tag logic 213, a transceiver 214, a Subscriber Identity Module (SIM) Card 216, and a battery 218. Processor 210 receives input and issues commands to deliver output through the other components. Memory 212 holds information for enabling processor 210 to operate the other components of borrowing mobile communication device 200, and contains borrowing logic 213. Borrowing logic 213 allows borrowing mobile communication device 200 to use network services to which a user is not currently subscribed. Borrowing logic 213 is used to connect to a lending mobile communication device for using a network service of the lending mobile communication device. Transceiver 214 converts wireless signals received by antenna 208 to information capable of processing by processor 210, and vice-versa. Transceiver 214 can use one or more wireless protocols, including cellular RF, WiFi, BLUETOOTH, etc., to communicate with the network and other mobile communication devices. Battery 218 powers borrowing mobile communication device 200.

There are many embodiments of a borrowing mobile communication device that are capable of being equipped with the present subject disclosure. For instance, many legacy model cellular telephones are capable of executing the borrowing logic described above. In other embodiments of the mobile communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments, the borrowing mobile communication device may not have a physical keypad for input. Instead, a virtual keypad is displayed on the touch screen and the user inputs by touching the virtual keys. Other forms of input such as full keyboards, accelerometers, motion sensors, etc., can be utilized in the borrowing mobile communication device. The memory can be a non-removable internal memory, or a removable memory such as in a subscriber identity module (SIM) card or a memory card inserted into a memory card reader. Many borrowing mobile communication devices have more than one transceiver or a transceiver that supports more than one protocol. For instance, it is not uncommon for a borrowing mobile communication device to support cellular radio frequency (RF), WiFi, and BLUETOOTH® protocols.

Figures 3A, 3B:
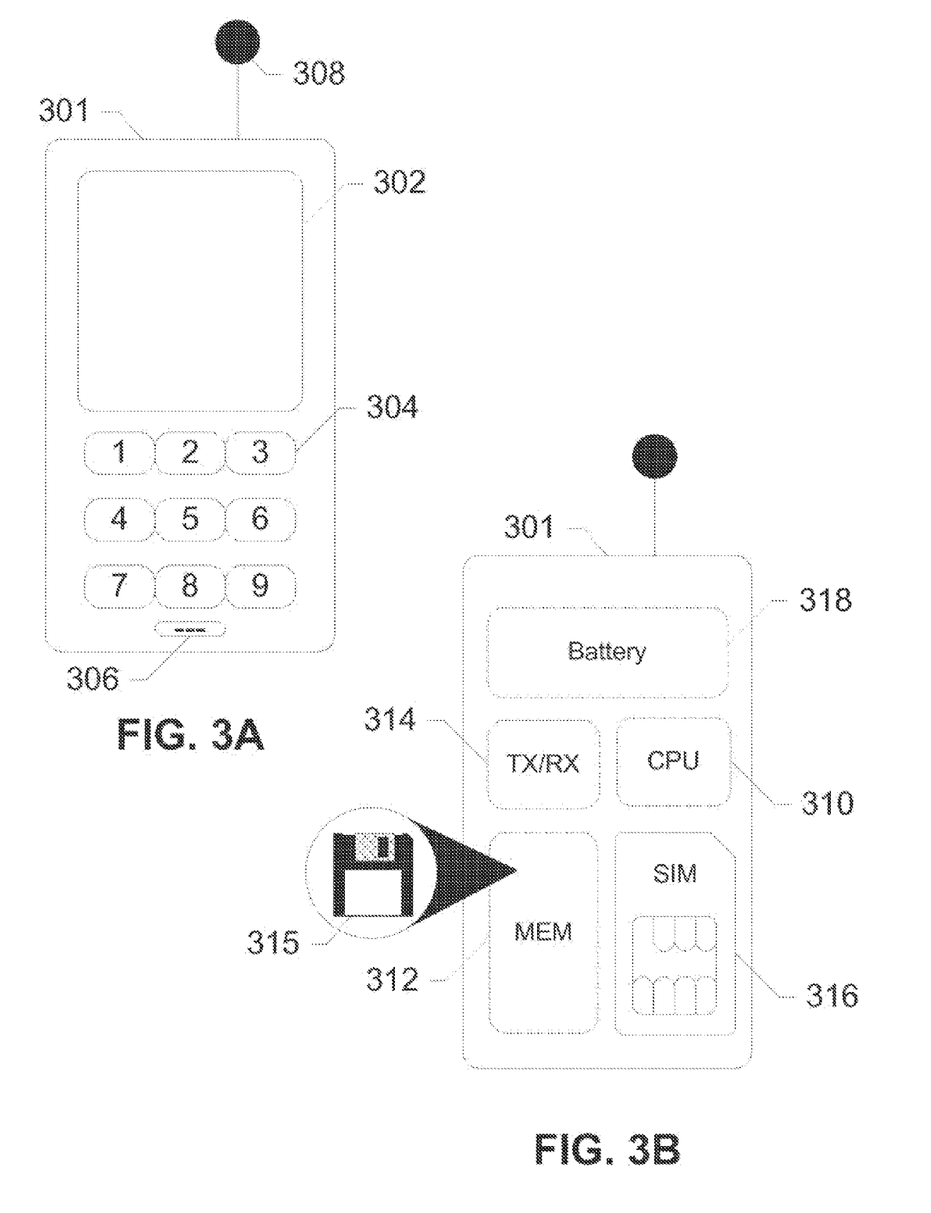
FIG. 3A shows a lending mobile communication device for sharing network services, according to an exemplary embodiment of the present subject disclosure.
FIG. 3B shows the inner components of a lending mobile communication device, according to an exemplary embodiment of the present subject disclosure.

FIG. 3A shows a lending mobile communication device 301 for sharing network services, according to an exemplary embodiment of the present subject disclosure. Lending mobile communication device 301 includes a display 302, a keypad 304, a microphone 306, and an antenna 308. Display 302 is a liquid crystal display (LCD) which serves as a visual output for the user. Keypad 304 is an input for entering information and commands to lending mobile communication device 301. Microphone 306 accepts aural input and allows lending mobile communication device 301 to deliver voice communication to the network and other mobile communication devices. Antenna 308 sends and receives wireless radiofrequency (RF) signals to and from wireless networks and other wireless devices.

FIG. 3B shows the inner components of a lending mobile communication device 301, according to an exemplary embodiment of the present subject disclosure. The inner components of lending mobile communication device 301 include a processor 310, a memory 312 including a lending logic 315, a transceiver 314, a Subscriber Identity Module (SIM) Card 316, and a battery 318. Processor 310 receives input and issues commands to deliver output through the other components. Memory 312 holds information for enabling processor 310 to operate the other components of lending mobile communication device 301, and contains lending logic 315. Lending logic 315 allows lending mobile communication device 301 to lend network services to which a borrowing user is not currently subscribed. Lending logic 315 is used to allow a connection with a borrowing mobile communication device for using a network service of lending mobile communication device 301. Transceiver 314 converts wireless signals received by antenna 308 to information capable of processing by processor 310, and vice-versa. Transceiver 314 can use one or more wireless protocols, including cellular RF, WiFi, BLUETOOTH, etc., to communicate with the network and other mobile communication devices. Battery 318 powers lending mobile communication device 301.

There are many embodiments of a lending mobile communication device that are capable of being equipped with the present subject disclosure. For instance, many legacy model cellular telephones are capable of executing the lending logic described above. In other embodiments of the lending mobile communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments, the lending mobile communication device may not have a physical keypad for input. Instead, a virtual keypad is displayed on the touch screen and the user inputs by touching the virtual keys. Other forms of input such as full keyboards, accelerometers, motion sensors, etc., can be utilized in the lending mobile communication device. The memory can be a non-removable internal memory, or a removable memory such as in a subscriber identity module (SIM) card or a memory card inserted into a memory card reader. Many lending mobile communication devices have more than one transceiver or a transceiver that supports more than one protocol. For instance, it is not uncommon for a lending mobile communication device to support cellular radio frequency (RF), WiFi, and BLUETOOTH® protocols.

The borrowing and lending mobile communication devices of FIG. 1 are presented for illustration of the system. For practical application, embodiments of the present invention include mobile communication devices having both borrowing and lending logic. Thus, a user equipped with the ability to borrow or share network services.

Figure 4:
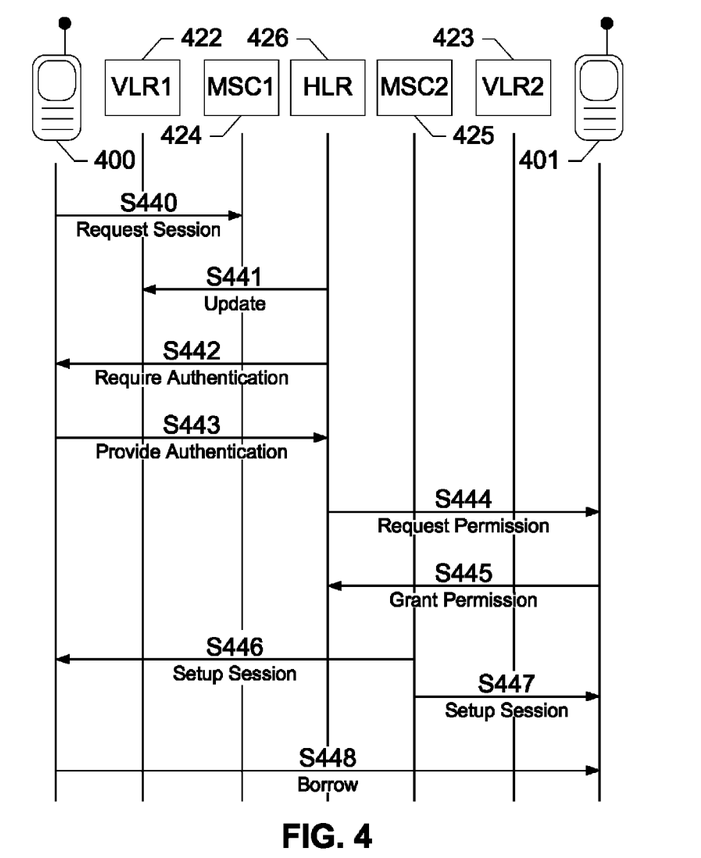
FIG. 4 shows a process flow diagram for sharing network services, according to an exemplary embodiment of the present subject disclosure.

FIG. 4 shows a process flow diagram for sharing network services, according to an exemplary embodiment of the present subject disclosure. The process flow diagram involves communication among a borrowing mobile communication device 400, a first VLR 422, a first MSC 424, an HLR 426, a second MSC 425, a second VLR 423, and a lending mobile communication device 401. A user of borrowing mobile communication device 400 selects a peer subscriber choice in a borrowing application which sends a request for a network service sharing session (S440) to first MSC 424. First VLR 422 checks the current location of the user and updates (S441) from HLR 426 if needed. HLR 426 authenticates the user requesting the network service sharing session (S442) and also checks if the user subscribes to network service sharing. Borrowing mobile communication device 400 provides authentication (S443) in the form of a password, PIN, etc. HLR 426 then requests permission from lending mobile communication device 401 to engage in a network service sharing session (S444) with borrowing mobile communication device 400. If lending mobile communication device 401 grants permission (S445) for the network service sharing session, then HLR 426 authenticates the network service sharing session. Second MSC 425 then sets up the session (S446, S447) between the two mobile communication devices, after lending mobile communication device 401 grants the request. Borrowing mobile communication device 400 can now use the shared services of lending mobile communication device 401 (S448). The respective MSCs keep track of the user locations set up on the session.

Once in a network service sharing session, the user of borrowing mobile communication device 400 can make a voice call, use data services, text, etc., through lending mobile communication device 401 which is as usual as lending mobile communications device 401 using services using the packet, messaging, or IMS core network. When borrowing mobile communication device 400 places a call, a caller ID of borrowing mobile communication device 400 is displayed.

In other exemplary embodiments, the user of the borrowing mobile communication device may initiate a session with multiple lending mobile communication devices enabling a group sharing session. In addition to sharing network services, users can share displays using an IMS core network. During display sharing, the borrowing mobile communication device displays the contents of the display of lending mobile communication device. The user of the lending mobile communication device can see the current activities by the borrowing mobile communication device, and can terminate the session if needed. Once the sharing session ends, the usage will be processed and the users will be billed accordingly. The user of the lending mobile communication device must acknowledge the request from the borrowing party upon seeing a notification. Once approved, a sharing session starts for a user set default duration. In other embodiments, the user of the lending mobile communication device pre-authorizes selected users for a certain amount of minutes or data use. If pre-authorized, then the user of the lending mobile communication device won't have to authenticate the sessions under specific conditions, but is able to monitor the activities of the borrowing mobile communication device. The user of the lending mobile communication device has the option to terminate the sharing session if needed. The users can check the recent sessions, and active and current usage. Once the sharing session is active, the HLR tracks and reports the usage to a billing server.

Users having a mobile communication device having both borrowing and lending logic may be lending a network service to one mobile communication device but needing to borrow a network service from another mobile communication device. In another exemplary embodiment of the present invention, a sharing session can be released from the lending mobile communication device, yet maintained between the borrowing mobile communication device and the HLR. Thus, the borrowing mobile communication device continues to use the network service of the lending mobile communication device, and the lending mobile communication device is free to borrow a network service of another mobile communication device. The HLR continues to track the usage of the borrowing mobile communication device. This system also allows the lending mobile communication device to share network services with other borrowing mobile communication devices. Network resources are conserved by releasing the lending mobile communication device regardless of the follow-up activity. However, when display sharing the lending mobile communication device cannot be released from the sharing session.

Figure 5:
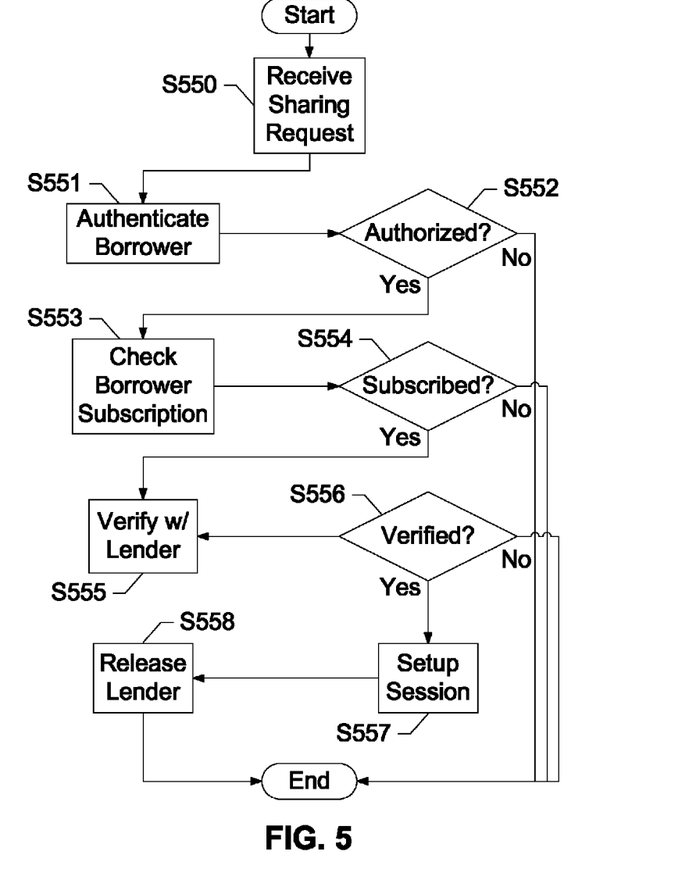
FIG. 5 shows a flow chart for establishing a session for sharing network services, according to an exemplary embodiment of the present subject disclosure.

FIG. 5 shows a flow chart for establishing a session for sharing network services, according to an exemplary embodiment of the present subject disclosure. The flow chart begins when an HLR receives a request for a network service sharing session (S550) from a borrowing mobile communication device. The HLR first authenticates the borrowing mobile communication device (S551) by using registration credentials such as IMSI. The HLR authorizes the session (S552) if the credentials are valid. The HLR then references the subscriber profile of the borrowing mobile communication device for a network service sharing subscription (S553). If a network service sharing subscription is found (S554), then the HLR moves onto verifying the session with the lending mobile communication device (S555). The user of the lending mobile communication device sees an alert on the display of the lending mobile communication device that a user is asking to have a network service sharing session. If the user of the lending mobile communication device approves the sharing session (S556), then the HLR sets up the sharing session (S557), and the borrowing mobile communication device begins to use services on the lending mobile communication device. If at any point the HLR does not authorize or does not find a subscription, then the HLR ends the process. Likewise, if the user of the lending mobile communication device denies the session, then the process ends. Once the sharing session is setup, the lending mobile communication device is released from the connection (S558), and the sharing session is maintained between the borrowing mobile communication device and the HLR.

In some embodiments, the mobile carrier will have the capability to track both the SIMs in the session. In other embodiments, the MSC VLR gets a response from the HLR and updates the subscriber data to set up the sharing session. In further embodiments, once the session is established, the MSC/VLR tracks both the SIMs and usage. The service provider tracks the usage and the called user will be charged for the use of services. In most embodiments, the lending mobile communication device and the borrowing mobile communication device are served by same service provider. However, in embodiments where the mobile communication devices are served by different service providers the sharing session usage, as tracked by the HLR, goes through a brokerage for settlement charges before appropriate billing is distributed. In some of these multi-provider sharing session embodiments, there are settlements between service providers and carriers to make the process more efficient.

Figure 6:
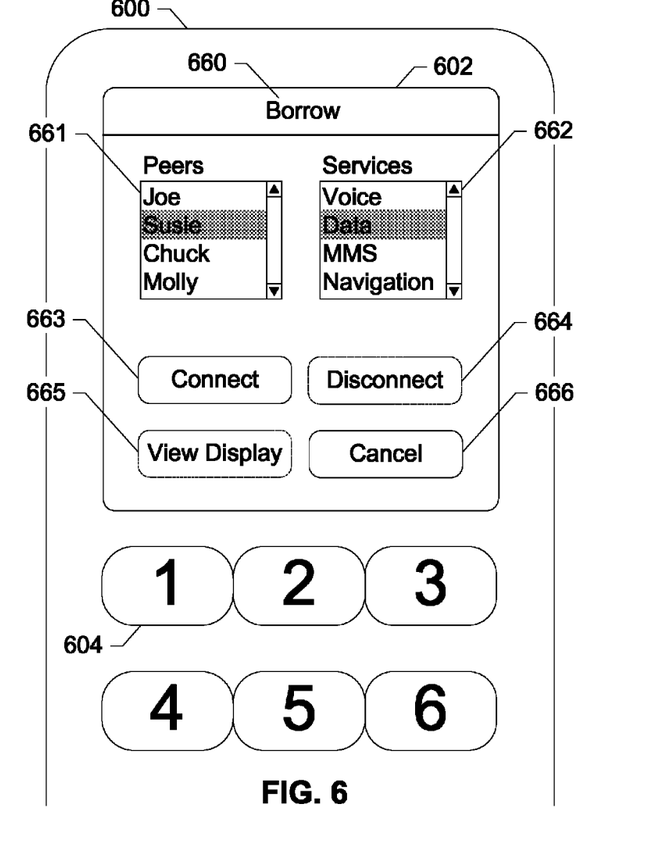
FIG. 6 shows a program for using a shared network service, according to an exemplary embodiment of the present subject disclosure.

FIG. 6 shows a borrowing program 660 on a borrowing mobile communication device 600 for using a shared network service, according to an exemplary embodiment of the present subject disclosure. Borrowing program 660 includes a list of peers 661, a list of services 662, a connect button 663, a disconnect button 664, a view display button 665, and a cancel button 666. The calling party opens up borrowing program 660 and peer list 661 is displayed. When a peer is highlighted, services to which the peer is subscribed appear in services list 662. Once a service is highlighted, the user activates connect button 663 to initiate the sharing session. While the user is connected, the user may activate view display button 665 to begin viewing the display contents of the lending mobile communication device. Once the user of borrowing mobile communication device 600 is done with the sharing session, the user activates disconnect button 664. Disconnect button 664 and view display button 665 are shown dimmed. Once a sharing session is established, disconnect button 664 and view display button 665 become selectable while connect button 663 becomes dimmed. If the user has not yet connected to a lending mobile communication device in a sharing session, and suddenly loses the desire, the user can activate cancel button 666, which exits borrowing program 660.

In other embodiments, the peer list can be prioritized by user favorites and also the current location of the peer. In some embodiments, the connect button is activated by touching the area of a touch screen, using a keypad, etc. For mobile communication devices having a plurality of communication technologies, a choice of connecting to the lending mobile communication device through BLUETOOTH, WiFi, etc., is available. Some embodiments cater to users seeking a specific service. When this service is selected, only available peers having that service appear in the peer list.

Figure 7:
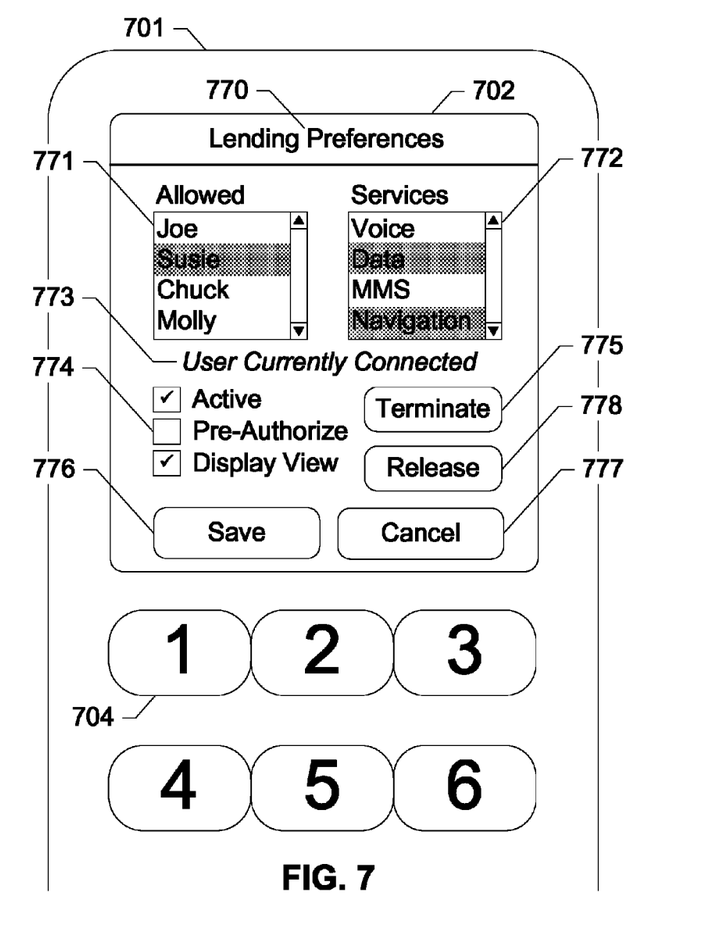
FIG. 7 shows a program for sharing a network service, according to an exemplary embodiment of the present subject disclosure.

FIG. 7 shows a lending preferences program 770 on a lending mobile communication device 701 for sharing a network service, according to an exemplary embodiment of the present subject disclosure. Lending preferences 770 includes a list of allowed peers 771, a list of allowed services 772, a lending status 773, a peer options list 774, a terminate button 775, a release button 778, a save button 776, and a cancel button 777. Allowed peer list 771 includes peers that are authorized to borrow services from lending mobile communication device 701. When a peer is highlighted, service list 772 includes possible networks services to share with the selected peer. In this embodiment, the peer, Susie, is allowed to borrow data and navigation services when she connects. Lending status 773 tells the user whether or not a peer is connected in a sharing session. In this embodiment, a peer is currently connected, and therefore terminate peer button 775 can be activated to end the sharing session and disconnect the peer. Release button 778 can also be used when a peer is connected. Activating release button 778 releases lending mobile communication device 701 from the sharing session. Unlike terminate button 775, activating release button 778 maintains the sharing session between the peer and the HLR on the network. When display sharing is enabled, release button 778 becomes inactive. Once display sharing has ceased, release button 778 becomes active once again. Peer options list 774 includes options for activating/deactivating the peer from borrowing privileges, pre-authorization of a peer, and sharing the display of lending mobile communication device 770. In this embodiment, peer Susie is active and allowed to view the display of lending mobile communication device 701, but is not pre-authorized. This means that the user of lending mobile communication device 701 must authorize Susie each and every time she connects. Once the user has finished editing lending preferences 770, save button 776 is activated to write the settings to memory. If the user decides not to save any of the changes made to lending preferences 770, then the user activates the cancel button 777 so that none of the changes are written to memory.

In other embodiments of the lending preferences, the lending user has more options available. A separate password can be created for each allowed peer, and that password is checked at the lending mobile communication device instead of the HLR. Along with the option to pre-authorize a peer for a sharing session, a lending user can set an amount of pre-authorized time or pre-authorized services. Any use outside of this time or service(s) by a borrowing mobile communication device requires lender approval before use.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A device comprising:
a processor; and
a memory that stores computer readable instructions that, when executed by the processor, causes the processor to perform operations comprising
specifying preferences for establishing sharing sessions, the preferences comprising an option to pre-authorize the sharing sessions for a requesting borrowing device,
pre-authorizing the requesting borrowing device in response to detecting selection of the option to pre-authorize the requesting borrowing device,
receiving a request to establish a sharing session, the request being received from a home location register on a network and indicating that the requesting borrowing device requests sharing of a network service that is accessible to the device and inaccessible to the requesting borrowing device without the sharing session,
indicating, to the home location register, that the device grants permission for the requesting borrowing device to access the network service that is accessible to the device based upon the preferences,
detecting that the sharing session has been established by a mobile switching center of the network, the sharing session comprising a session between the device and the requesting borrowing device to share the network service,
sharing a display associated with the device with the requesting borrowing device during the sharing session; and
allowing the requesting borrowing device to use the network service shared by the device during the sharing session.

2. The device of claim 1, wherein the home location register stores a subscriber profile for the requesting borrowing device and stores a further subscriber profile for the requesting borrowing device.

3. The device of claim 2, wherein the home location register verifies a network service sharing subscription associated with the device, and wherein the home location register authenticates the requesting borrowing device prior to requesting establishment of the sharing session.

4. The device of claim 1, wherein specifying the preferences for establishing the sharing sessions comprises specifying a password for the sharing session with the requesting borrowing device.

5. The device of claim 1, wherein specifying the preferences for establishing the sharing sessions comprises specifying a separate password for each of a plurality of peers, the peers comprising the requesting borrowing device.

6. The device of claim 5, wherein the device checks the password.

7. The device of claim 1, wherein pre-authorizing the requesting borrowing device comprises pre-authorizing the requesting borrowing device for a limited time.

8. The device of claim 1, wherein specifying the preferences comprises specifying that a display of the device is to be shared during the sharing sessions.

9. The device of claim 1, wherein specifying the preferences comprises specifying what network services are to be shared during the sharing sessions, the network services comprising navigation services accessible to the device.

10. The device of claim 1, wherein the instructions comprises instructions that, when executed by the processor, cause the processor to perform operations further comprising
displaying, on a display of the device, a release button, the selection of which causes the device to release the device from the sharing session while continuing the sharing session between the requesting borrowing device and the home location register.

11. A method comprising:
receiving, at a network comprising a home location register, a mobile switching center, and a further mobile switching center, a request to initiate a sharing session between a requesting borrowing device and a lending device, the request being received at the mobile switching center from the requesting borrowing device and requesting access to a network service that is accessible to the lending device and inaccessible to the requesting borrowing device without the sharing session;
authenticating, by the home location register, the requesting borrowing device to determine that the requesting borrowing device subscribes to a network sharing service and to authenticate a user of the requesting borrowing device;
requesting, by the home location register, permission for the sharing session from the lending device;
receiving, by the home location register, the permission from the lending device;
establishing, by the further mobile switching center, the sharing session between the requesting borrowing device and the lending device;
allowing the requesting borrowing device to view a display associated with the lending device; and
allowing the requesting borrowing device to use the network service shared by the lending device during the sharing session.

12. The method of claim 11, wherein the network service comprises a network navigation service.

13. The method of claim 11, wherein the network service comprises a voice service.

14. The method of claim 13, further comprising releasing the lending device from the sharing session while maintaining the sharing session between the home location register and the requesting borrowing device, in response to detecting selection of a release option at the lending device.

15. The method of claim 11, further comprising ending the sharing session in response to detecting selection of a terminate option at the lending device.

16. The method of claim 11, wherein authenticating the requesting borrowing device comprises enforcing a password received from the lending device, and wherein the requesting borrowing device is pre-authorized for the sharing session by preferences set at the lending device.

17. A method comprising:
 receiving, at a network comprising a home location register, a mobile switching center, and a further mobile switching center, a request to initiate a sharing session between a requesting borrowing device and a lending device, the request being received at the mobile switching center from the requesting borrowing device and requesting access to a network service that is accessible to the lending device and inaccessible to the requesting borrowing device without the sharing session;
 authenticating, by the home location register, the requesting borrowing device to determine that the requesting borrowing device subscribes to a network sharing service and to authenticate a user of the requesting borrowing device;
 determining that the lending device subscribes to the network sharing service;
 requesting, by the home location register, permission for the sharing session from the lending device;
 receiving, by the home location register, the permission from the lending device, the permission comprising a preference indicating that the requesting borrowing device is pre-authorized for the sharing session;
 establishing, by the further mobile switching center, the sharing session between the requesting borrowing device and the lending device;
 allowing the requesting borrowing device to view a display associated with the lending device; and
 allowing the requesting borrowing device to use the network service shared by the lending device during the sharing session.

18. The method of claim 17, wherein the network service comprises a data service.

19. The method of claim 17, wherein the network service comprises a voice service.

20. The method of claim 19, further comprising releasing the lending device from the sharing session while maintaining the sharing session between the home location register and the requesting borrowing device, in response to detecting selection of a release option at the lending device.

\* \* \* \* \*